US009029748B2

(12) United States Patent
Lahaie et al.

(10) Patent No.: US 9,029,748 B2
(45) Date of Patent: May 12, 2015

(54) METHOD AND APPARATUS FOR PHOTON COUNTING WITH OPTICAL SPACE SPREADING

(71) Applicant: Her Majesty the Queen in Right of Canada, as Represented by the Minister of Nation, Ottawa, CA (US)

(72) Inventors: Pierre Lahaie, Québec (CA); Jean-Robert Simard, Québec (CA)

(73) Assignee: Her Majesty the Queen in Right of Canada, as Represented by the Minister of National Defence, Ottawa, Ontario (CA)

( * ) Notice: Subject to any disclaimer, the term of this patent is extended or adjusted under 35 U.S.C. 154(b) by 278 days.

(21) Appl. No.: 13/835,003

(22) Filed: Mar. 15, 2013

(65) Prior Publication Data

US 2014/0263949 A1    Sep. 18, 2014

(51) Int. Cl.
*H04N 5/3745* (2011.01)
(52) U.S. Cl.
CPC ....... *H04N 5/3745* (2013.01); *H01J 2237/2443* (2013.01); *H01J 2237/2445* (2013.01)
(58) Field of Classification Search
CPC .................. H01J 2237/2445; H01J 2237/2443; H01J 49/162; H01J 2231/5001; H04N 5/3745
See application file for complete search history.

(56) References Cited

U.S. PATENT DOCUMENTS

| | | | |
|---|---|---|---|
| 6,288,399 B1 * | 9/2001 | Andreaco et al. | 250/368 |
| 7,858,917 B2 | 12/2010 | Stern et al. | |
| 8,039,784 B2 | 10/2011 | Schmitt | |
| 8,723,132 B2 * | 5/2014 | Baeumer et al. | 250/370.11 |
| 2006/0215264 A1 * | 9/2006 | Birk et al. | 359/487 |

FOREIGN PATENT DOCUMENTS

| | | |
|---|---|---|
| WO | 2008/146230 A2 | 12/2008 |
| WO | 2011/119306 A1 | 9/2011 |

OTHER PUBLICATIONS

Mikulec et al., "A High Resolution, High Frame Rate Detector Based on a Microchannel Plate Readout With the Medipix2 Counting CMOS Pixel Chip", IEEE Transactions on Nuclear Science, vol. 52, No. 4, Aug. 2005, pp. 1021-1026.

(Continued)

*Primary Examiner* — Francis M Legasse, Jr.
(74) *Attorney, Agent, or Firm* — Curtis B. Behmann; Borden Ladner Gervais LLP

(57) ABSTRACT

A method and apparatus for photon counting are disclosed. In an implementation, the present disclosure provides a dynamic-range photon-counting spectrometric sensor for low signal detection embedded in large parasitic background light signal. Rather than using a known forward illuminated imager approach of counting photons directly, embodiments of the present disclosure use a backward illuminated imager approach to generate a burst of electrons based on the photons, and perform photon detection by counting the generated burst of electrons using the plurality of CMOS chip pixels. An electronic circuit, in communication with the CMOS chip pixels, includes a fast clock enabling discrimination between electrons in time. The electronic circuit can be built on the face of a semiconductor wafer on which the CMOS chip pixels are provided.

20 Claims, 5 Drawing Sheets

(56) References Cited

OTHER PUBLICATIONS

Taketoshi et al., "Studies of Multiplication Process of a Novel Image Intensifier of an Amplified Metal-Oxide-Semiconductor Imager Overlaid with Electron-Bombarded Amorphous Silicon", IEEE Transactions of Electron Devices, vol. 46, No. 8, Aug. 1999, pp. 1619-1622.

Chen et al., "Application of Resonance Raman Lidar for Chemical Species Identification", SPIE vol. 3065, Aug. 6, 1997, p. 279-285.

* cited by examiner

METHOD AND APPARATUS FOR PHOTON COUNTING WITH OPTICAL SPACE SPREADING

FIELD

The present disclosure relates to remote surveillance and monitoring, including approaches using photon counting.

BACKGROUND

For many applications of remote surveillance and monitoring, gathering detailed information about the surrounding environment is of prime importance. One approach is based on the spectrometric detection of laser induced fluorescence from aerosols and gases delimited in air volumes. Such air volumes can be several metres to several hundreds of metres long at ranges varying from a few tens of metres to a few kilometres in range, using intensified range-gated inelastic Lidar (Light Detection And Ranging). This technology has the capacity to detect single photons. Direct photon counting has the advantage of providing light information free of any electronic noise contribution generated by the sensor, making the sensor sensitivity an absolute optimum from an electronic design point of view.

However, such a photon counting detection approach is applicable only if the sensor electronics are able to count one photon at the time (individual photon collection and read out). This limits this optimum detection technique to very low photonic signal scenarios such as the night surveillance of traces of fluorescing aerosols. This technique is not practical during the day or with dense plumes of fluorescing aerosols. With high photon flux, present state-of-the-art implementations of counting electronics are unable to react quickly enough to discern individual photon arrivals.

Two known approaches are used to perform an optimum surveillance of fluorescing aerosols with intensified range-gated inelastic Lidar. The first approach is to detect simultaneously the collected photonic signals by photon counting and by the classical analog method (as CCD counts), such as by using an apparatus as shown in FIG. 1. An image intensifier 10 is in communication with a charge coupled device (CCD) sensor 18. The image intensifier 10 includes a photocathode 12, a micro-channel plate 14, and a phosphor screen, or phosphor plate, 16. The CCD sensor 18 evaluates the number of collected photons and, based on a statistical threshold, will switch between the two electronic detection methods, accepting a deterioration of the sensitivity when the phenomenology detected produces too many photons for the "photon counting method".

The second approach is to expand the dynamic range of photon counting applicability, which is equivalent to increasing the statistical threshold between photon counting and analog detection. This second approach either distributes, as a function of photon wavelength, the collected photons over a linear array of single photon detection capable detectors, or it increases the time sampling of the photon detection signal, which is equivalent to slicing in time a range-distributed photonic source (that is, a photonic source, or light source, that is distributed in space or occupies a certain volume in space).

Switching between a photon counting mode and analog detection (and the corresponding reduction in sensitivity) because the photonic signal is too intense is a drawback of known approaches. Distributing the photonic signal as a function of wavelength (1-dimensional expansion) over a linear array of detectors does not sufficiently reduce the amount of photons per detector for day-time surveillance, or when probing a dense plume of fluorescing aerosols to satisfy the statistical threshold for photon counting detection.

Similarly, unless one can implement the equivalent of several time windows (or range gates, or range intervals) sufficiently short to each contain a single photon and that can be juxtaposed in time and read out by the electronics independently, reducing the time window corresponds to rejecting useful signal and does not contribute to increasing the sensitivity of the sensor.

Furthermore, as for spectrally distributed signals, time distributed signals (again a 1-dimensional expansion) do not sufficiently reduce the amount of photons per juxtaposed time window during day time surveillance or when probing a dense plume of aerosol to satisfy the statistical threshold for photon counting.

In addition to the known approaches described above, another photon counting approach includes a Geiger-mode avalanche photodiode. However, an avalanche photodiode cannot be positioned in matrix as easily as a CMOS detector, or reliably achieve a desired clock speed. Therefore they will have a similar problem of sensitivity as a conventional CCD or CMOS imager, where the detection and the circuitry are placed on the same surface. The surface devoted to the circuitry is not sensitive to light so this diminishes the sensitivity of the chip.

It is, therefore, desirable to provide a method and apparatus that reduces or removes at least one drawback of known approaches, such as by operating a sensor always in photon counting mode.

BRIEF DESCRIPTION OF THE DRAWINGS

Embodiments of the present disclosure will now be described, by way of example only, with reference to the attached Figures.

DETAILED DESCRIPTION

Figure 1:
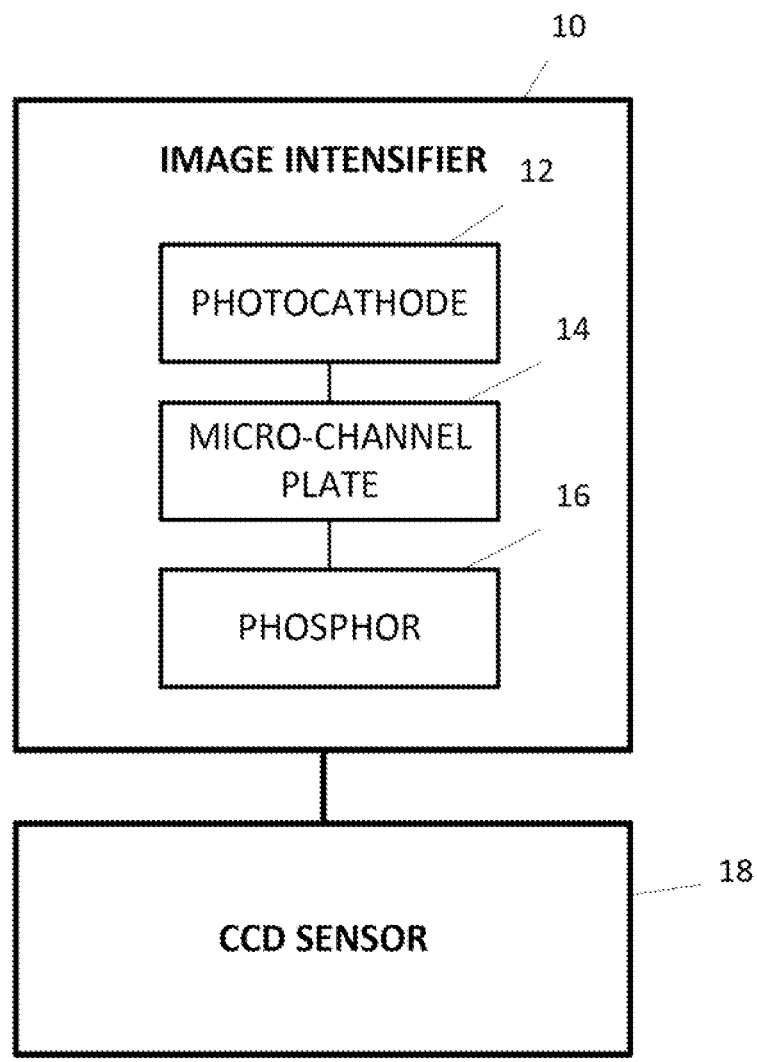
FIG. 1 illustrates a known analog apparatus for collecting a photon image.

Generally, the present disclosure provides a method and apparatus for photon counting. In an embodiment, the present disclosure provides a dynamic-range photon-counting spectrometric sensor for detecting a low level signal embedded in a large parasitic background light signal. Rather than using a known approach of counting photons directly, implementations of the present disclosure generate a burst of electrons based on the photons, and perform photon detection by counting the generated burst of electrons using a plurality of CMOS chip pixels. An electronic circuit, in communication with the CMOS chip pixels, includes a fast clock enabling time discrimination between electrons events, or electron bursts. The electronic circuit can be built on the face of a semiconductor wafer on which the CMOS chip pixels are provided or defined.

In an embodiment, the present disclosure provides a photon counting sensor, comprising: an image intensifier, a CMOS image sensor, and an electronic circuit. The image intensifier is configured to receive a photon beam, to perform optical space spreading by defocusing the photon beam, and to generate a burst of electrons as a function of the photon beam. The CMOS image sensor comprising a plurality of CMOS chip pixels configured to receive, and optionally count electrons in, the generated burst of electrons. The electronic circuit is in communication with the plurality of CMOS chip pixels, and includes a fast clock configured to perform photon detection by discriminating in time between a plurality of electrons in the generated burst of electrons received at the plurality of CMOS chip pixels.

In an example embodiment, the image intensifier comprises a photocathode and a micro-channel plate, and the image intensifier performs optical space spreading by defocusing the beam over the surface of the photocathode. In an example embodiment, electrons exiting the photocathode are multiplied by the micro-channel plate.

In another example embodiment, the image intensifier comprises a photocathode and a silicon plate, and the image intensifier performs optical space spreading by defocusing the beam over the surface of the silicon plate. In an example embodiment, electrons exiting the photocathode are multiplied by ionization when the electrons hit the surface of the silicon plate in response to a voltage applied between the photocathode and the silicon plate.

In an example embodiment, the plurality of CMOS chip pixels are configured to perform the photon detection in response to a determination that: a number of detected electrons at a particular pixel is above a pre-determined threshold; and the particular pixel has the highest number of detected electrons in a neighborhood of pixels, the neighborhood of pixels having the same size as a size of the burst of electrons.

In an example embodiment, the electronic circuit includes a plurality of memory registers, in communication with the fast clock. The plurality of memory registers are configured to record the time of arrival of the plurality of electrons in the burst of electrons generated by the image intensifier. In an example embodiment, when a photon is detected, the value of a selected memory register associated with a selected CMOS chip pixel is increased by 1, indicating that a photon has been detected at the selected CMOS chip pixel. The selected memory register is among the plurality of memory registers and the selected CMOS chip pixel being among the plurality of CMOS chip pixels.

In an example embodiment, the electronic circuit comprises a plurality of pixel circuits, each of the plurality of pixel circuits being associated with one of the plurality of CMOS chip pixels. In an example embodiment, at least some of the plurality of pixel circuits comprise: a field effect transistor (FET) to receive the electrons from the image intensifier; a comparator, coupled to the output of the FET; a buffering system coupled to the output of the comparator, the buffering system comprising an AND gate and a D flip-flop, the photon detection being performed by detecting the falling edge of the electron burst with the D flip-flop.

In an example embodiment, the generated burst of electrons has a circular symmetric shape. In an example embodiment, the circular symmetric shape of the generated burst of electrons shows a gradient and is at a maximum intensity at its center.

In another embodiment, the present disclosure provides a photon counting method, comprising: receiving a photon beam; performing optical space spreading by defocusing the photon beam; generating a burst of electrons as a function of the photon beam; receiving the generated burst of electrons; and performing photon detection by discriminating in time between a plurality of electrons in the generated burst of electrons.

In an example embodiment, performing optical space spreading comprises defocusing the beam over the surface of a photocathode, for example including multiplying electrons exiting the photocathode using a micro-channel plate. In another example embodiment, performing optical space spreading comprises defocusing the beam over the surface of a silicon plate, for example including multiplying electrons exiting the photocathode by ionization when the electrons hit the surface of the silicon plate in response to a voltage applied between the photocathode and the silicon plate.

In an example embodiment, the photon detection is performed in response to a determination that: a number of detected electrons at a particular pixel is above a pre-determined threshold; and the particular pixel has the highest number of detected electrons in a neighborhood pixels, the neighborhood of pixels having substantially the same size as that of a burst of electrons.

In another example embodiment, the method further comprises recording, at a plurality of memory registers in communication with a fast clock, the time of arrival of the plurality of electrons in the burst of electrons. In an example embodiment, when a photon is detected, the method further comprises increasing the value of a selected memory register associated with a selected CMOS chip pixel by 1, indicating that a photon has been detected at the selected CMOS chip pixel.

Other aspects and features of the present disclosure will become apparent to those ordinarily skilled in the art upon review of the following description of specific embodiments in conjunction with the accompanying figures.

Embodiments of the present disclosure seek to overcome at least one of two obstacles in implementing photon counting in a remote sensing application of induced fluorescence. The first obstacle is the probability of photon arrival, and the second is the reading process. The probability of photon arrival, in a given region of the detector and in a given time interval, should be small enough that each photon can easily be discriminated and counted. The reading process should be such that the frame rate is fast enough to register individual pixel arrivals during daytime and dense cloud scenarios.

Such features are achieved according to an embodiment of the present disclosure by first spreading the light over a large collection area and second by introducing processing and information storage capability on the imager itself. An imager according to an embodiment of the present disclosure comprises an intensifier placed over the imager. When a photon strikes the intensifier and is absorbed, a burst of electrons is generated by a micro-channel plate and detected by the CMOS chip pixels on the imager. In an example embodiment, the shape of the electron burst is circularly symmetric; it shows a gradient and is at a maximum intensity at its center.

Known CMOS imager approaches recover light directly. A known CMOS imager does not have an image intensifier, and does not have an amplification process before detection. According to embodiments of the present disclosure, because the intent is to perform photon counting, an electron multiplication process is used.

Embodiments of the present disclosure do not provide a CMOS imager, but rather provide individual photon counters that are built using CMOS process fabrication. A CMOS image sensor according to an embodiment of the present disclosure is not an imager itself, since it does not integrate arriving photons, but rather counts photons.

Figure 2:
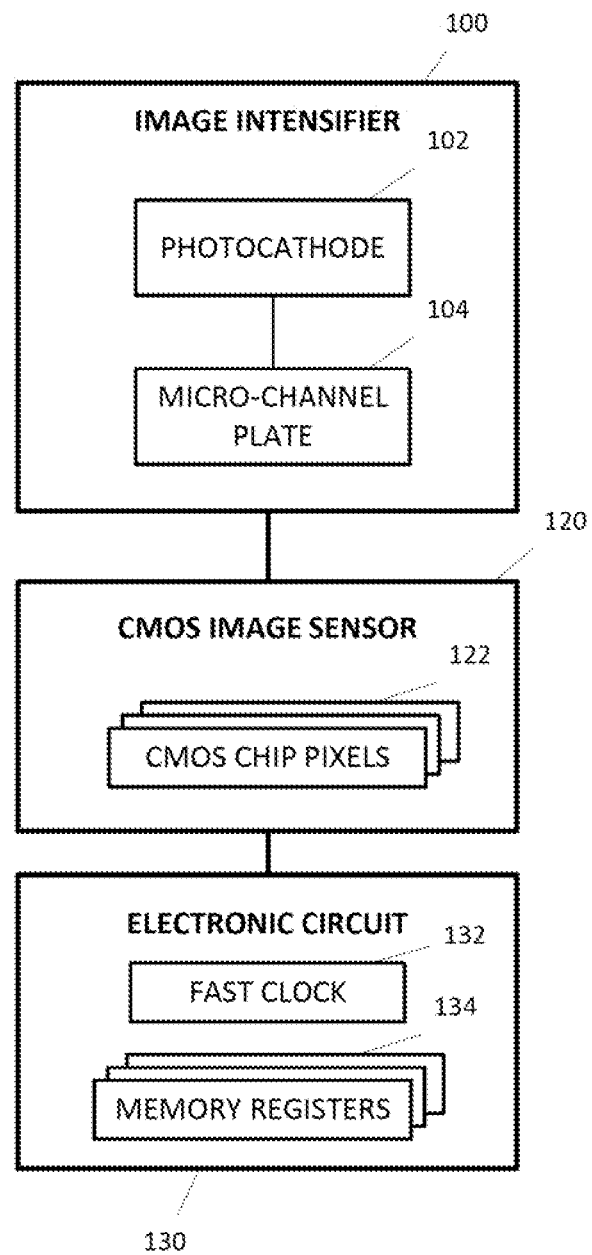
FIG. 2 illustrates a photon counter according to an embodiment of the present disclosure.

FIG. 2 illustrates a photon counter, or photon counting sensor, according to an embodiment of the present disclosure. The photon counting sensor includes an image intensifier 100, a CMOS image sensor 120 comprising a plurality of CMOS chip pixels 122, and an electronic circuit 130. The image intensifier 100 is configured to receive a photon beam, to perform optical space spreading by defocusing the photon beam, and to generate a burst of electrons as a function of the photon beam by amplifying the number of electrons generated by the photocathode.

In the embodiment of FIG. 2, the image intensifier 100 comprises a photocathode 102 and a micro-channel plate 104. The photocathode 102 generates an electron upon receiving a photon. The electron can be generated by any suitable process such as, for example, collisional ionization. The generated electron is received at an input side of the micro-channel plate 104, which, in turn, generates and outputs a burst of electrons at the output side of the micro-channel plate 104. In an embodiment, the image intensifier 100 performs optical space spreading by defocusing the beam (photon beam, light beam) over the surface of the photocathode 102. In an embodiment, a photon pattern on the photocathode is maintained by the micro-channel plate. In an embodiment, the image intensifier 100 comprises a lens or mirror system that is used to defocus light before hitting the photocathode.

Rather than using a known forward illuminated imager approach of counting photons directly, embodiments of the present disclosure use a backward illuminated imager approach to generate a burst of electrons based on the photons, and perform photon detection by counting the generated burst of electrons using a CMOS image sensor, or CMOS imager, 120. The CMOS image sensor 120 is used according to embodiments of the present disclosure instead of the phosphor and CCD sensor of FIG. 1. The plurality of CMOS chip pixels 122 in the CMOS image sensor 120 are configured to receive the generated burst of electrons, and in some embodiments configured to count electrons in the burst.

The electronic circuit 130, or recovery circuit or CMOS sensor circuit, comprises the logic, pulse amplifiers, detectors, etc. for controlling and operating the CMOS image sensor 120. In an example embodiment, the electronic circuit 130 comprises a plurality of pixel circuits, for example one pixel circuit for each CMOS chip pixel. The pixel circuit can be associated with, in communication with, or provided on the associated or corresponding CMOS chip pixel.

The electronic circuit 130 is in communication with the plurality of CMOS chip pixels 122, and includes a fast clock 132. The fast clock 132 is configured to detect photons by discriminating, in time, between the arrivals of different electron bursts at the plurality of CMOS chip pixels.

In an example embodiment, the electronic circuit 130 includes a plurality of memory registers 134, in communication with the fast clock 132, and configured to record the time of arrival of the plurality of electrons in the burst of electrons generated by the image intensifier 100. When a photon is detected according to an embodiment of the present disclosure, the value of a register contained within (or associated with) the pixel 122 is increased by 1, meaning a photon has been detected. The number of bits of the register is variable and depends on the specific application. In an embodiment of the present disclosure, the electronic circuit 130 is structured in a manner enabling fast readout of the complete matrix by cascading the information from register to register.

The electronic circuit 130 can be built on a face of a semiconductor wafer on which the CMOS image sensor and chip pixels are provided, such that for example the electronic circuit 130 and the CMOS chip pixels 122 are on opposite sides of the semiconductor wafer.

A method for photon detection according to an embodiment of the present disclosure comprises identifying (detecting) a pixel satisfying two conditions: 1) the amplitude of the signal associated with the number of detected electrons by that pixel is above a pre-determined threshold value (this ensures that the signal at the pixel is actually related to the detection of a photon); and 2) the pixel has the highest amplitude value in a pixel neighborhood of the same size as that of the burst of electrons produced by the detected photon. In an embodiment, photon counting is satisfied if the probability of arrival of two photons in the same zone is very small.

In other words, in an embodiment, the plurality of CMOS chip pixels are configured to perform the photon detection in response to a determination that: the number of electrons in the generated burst of electrons is above a pre-determined threshold (photoelectron multiplying threshold), indicating that a photon impinging on the photocathode has is correlated to a selected pixel receiving the burst of electrons; and the selected pixel has the highest number of electrons in a neighborhood of the same size as that of the burst of electrons.

Figure 3:
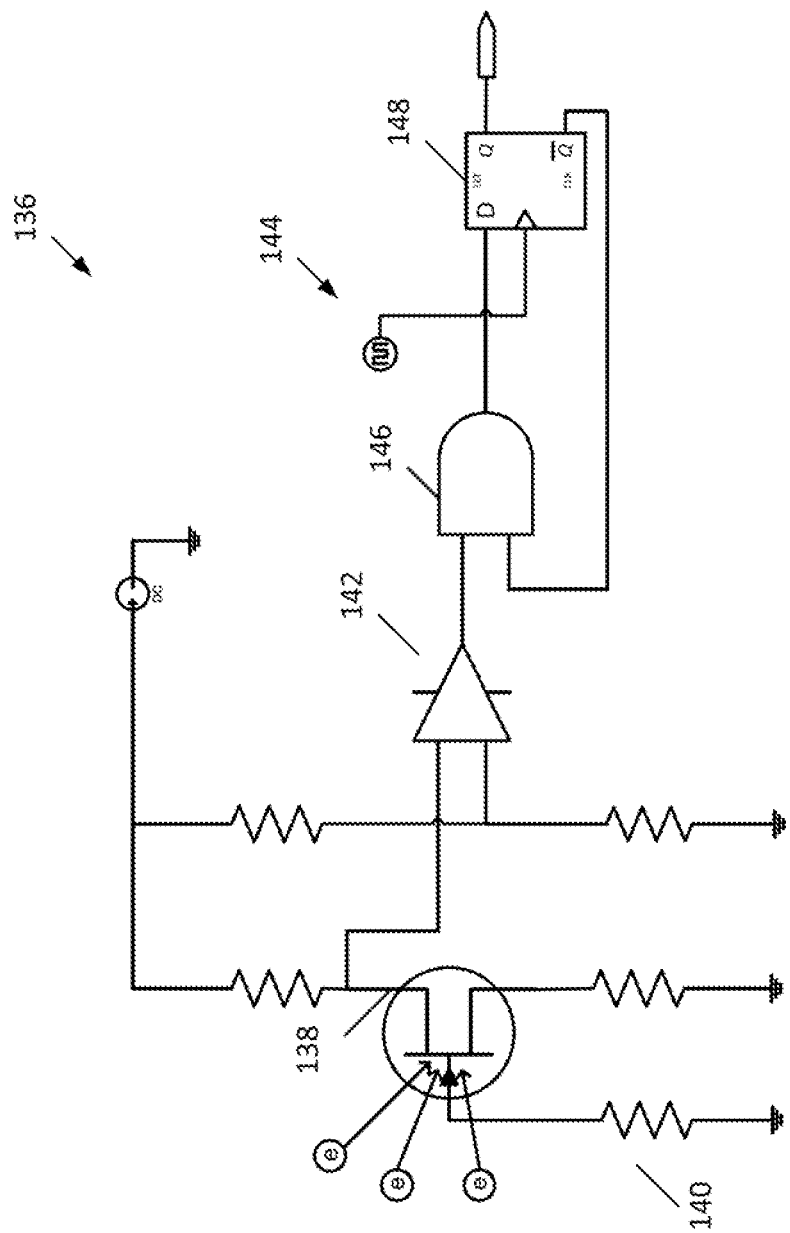
FIG. 3 illustrates a complementary metal-oxide semiconductor (CMOS) pixel chip of a photon counter according to an example embodiment of the present disclosure.

FIG. 3 illustrates a pixel circuit of a photon counter according to an example embodiment of the present disclosure. In an example embodiment, the electronic circuit 130 of FIG. 2 comprises a plurality of pixel circuits 136 as shown in FIG. 3, for example one pixel circuit 136 for each CMOS chip pixel 122. In various embodiments, the pixel circuit 136 is associated with, in communication with, or provided on the CMOS chip pixel 122. In the example embodiment of FIG. 3, the pixel circuit comprises an analog part and a first stage of a digital part with a buffer.

In the pixel circuit 136, the electrons from the micro-channel plate hit an input field effect transistor (FET) 138. The gate of this transistor 138 is drained to the ground using a high value resistor 140. The value of the resistance for the resistor 140 determines the response time of the electron detection system. The transistor 138 also acts as an amplifier. The output of the transistor 138 is sent to a comparator circuit 142, which feeds a buffering system 144 comprising an AND gate 146 and a D flip-flop 148. With respect to the D flip-flop 148, H is the clock signal and I is the input signal. The output of the pixel circuit 136 rises to 1 only when there is a transition at the output of the comparator 142 from the high voltage to low. In an example embodiment, at the output of the FET 138, a filter is added to cut the DC component from the biasing circuit.

A photon counter according to an embodiment of the present disclosure depends on the ability of a CMOS system to receive free electrons, such as electrons from the micro-channel plate. In an example embodiment, the photon counter is sealed to ensure that no air exists between the micro-channel plate and the chip, as this could impede the electrons from hitting the surface of the chip. In another example embodiment, a means is provided to control the potential electrostatic accumulation on the surface of the chip. In an example embodiment, the means comprises a grounding circuit providing electronic grounding of the semiconductor solid state circuit, such as employed in microchip fabrication methodologies.

According to an embodiment of the present disclosure, time spreading is achieved by using a clock fast enough to reduce the probability of multiple photons arriving during the clock minimal time interval increment to a small or negligible value. For example, time-resolution is applied to electron bursts arriving on the array of pixel detectors to discriminate between the arrival of these electron bursts. In an example embodiment, the photon detection is performed by detecting the falling edge of the electron burst with the D flip-flop 148 of FIG. 3.

Embodiments of the present disclosure provide a novel solution to count photons. Embodiments of the present disclosure described thus use a micro-channel plate feeding an electronic circuit detecting the arrival of photons at the photocathode, and count them by using a fast clock and memory registers to record their time of arrival.

Figure 4:
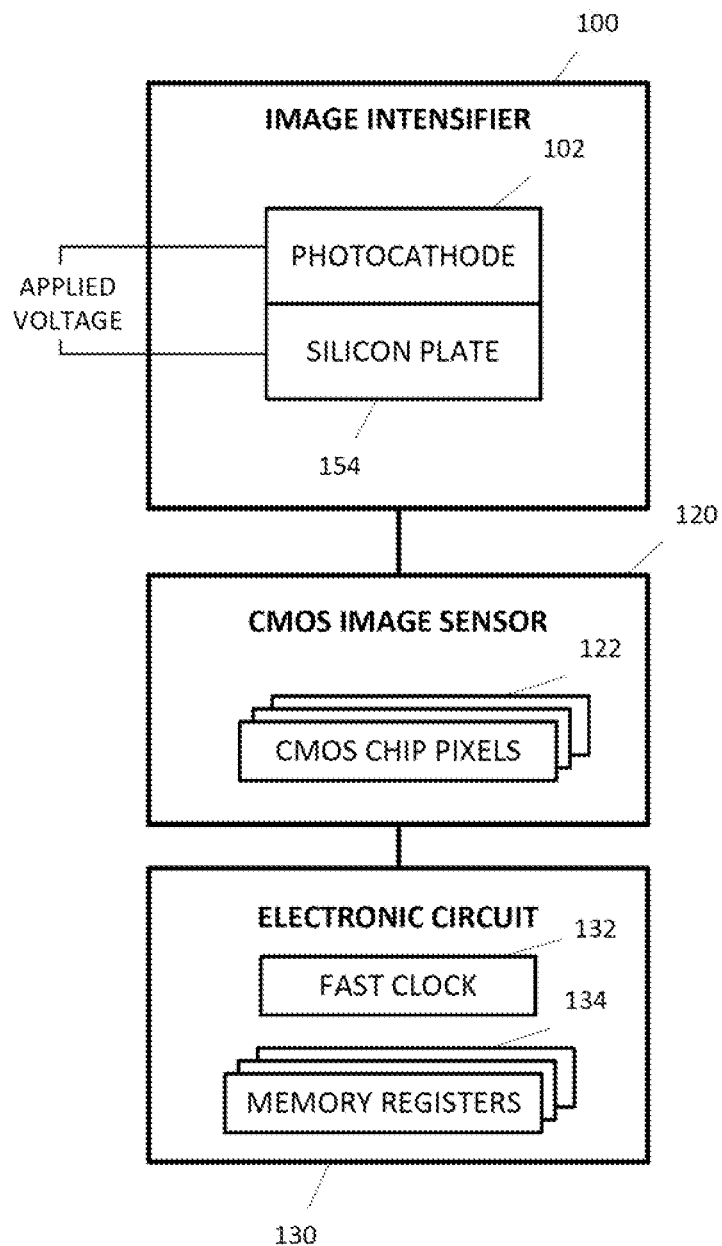
FIG. 4 illustrates a photon counter according to another embodiment of the present disclosure.

FIG. 4 illustrates a photon counter according to another embodiment of the present disclosure. Space spreading is achieved in the same way, i.e. by using an optical system, as in the embodiment of FIG. 2. When compared to the embodiment of FIG. 2, the micro-channel plate is removed, and electron amplification is achieved directly by collision multiplication of a high energy electron with the silicon material of a silicon plate 154.

In an example embodiment according to FIG. 4, the photocathode 102 is placed above the silicon plate 154, and there is nothing between the two structures, for example no air or gas. In an example embodiment, the photocathode 102 (which may include a plurality of photocathodes) is made with a material that emits an electron when a photon strikes. A negative voltage is applied, for example by an external power source, on the photocathode 102 so the electron is accelerated away when it exits the surface of the photocathode.

In an example embodiment, the silicon plate 154 is backward absorbing, meaning that it is very thin. When an electron strikes the silicon plate 154, a pulse of electrons is generated and this pulse drifts toward the active part of the circuit that is on the other side of the silicon wafer.

A strong potential difference (voltage) is applied between the photocathode 102 and the silicon surface of the silicon plate 154. In an example embodiment, the applied voltage is between about 500 volts and about 5,000 volts. The electron generated by the photon is accelerated and strikes the silicon surface with a high energy, generating an electron pulse (e.g. a plurality of electrons) in the conduction band of the semiconductor. The electron pulse drifts, such as under the influence of the electric field produced by the applied voltage, toward the other surface of the silicon plate 154.

The embodiment of FIG. 4 includes circuitry, such as an electronic circuit 130, which recovers the pulse, amplifies the pulse, and records the pulse as a photon arrival when it exceeds a given threshold. In an example embodiment, the threshold is a number of counts in the respective CMOS pixels. The electronic circuit 130 of FIG. 4 is similar to the electronic circuit 130 of FIG. 2. In an example embodiment, the photon sensor diminishes the probability of arrival of a pulse in time by increasing the clock speed. In an embodiment, the system is designed such that the diffusion time of electron bursts inside the silicon is smaller than the clock period. For example, if the electron arrives and generates an electron burst pulse that has a diffusion time, through the silicon, of 1 nanosecond, the clock should be set to, for example, 500 MHz, which is equivalent to a 2 nanosecond clock period. In an example embodiment, the clock speed, or time interval, is set to be longer than the time spreading of the electron pulse entering the circuit.

In an example embodiment, the silicon plate 154 is very thin so as to limit the spreading of the pulse while it drifts (this is a diffusion process). A small voltage can be applied in order to facilitate the movement toward the electronic circuit 130, or recovering circuitry. Another reason to provide a thin silicon plate 154 is that the thicker the plate, the more time is required to move to the other side; since there is diffusion, the pulse could be spread over more than one clock cycle which can impede the detection of the photon.

Figure 5:
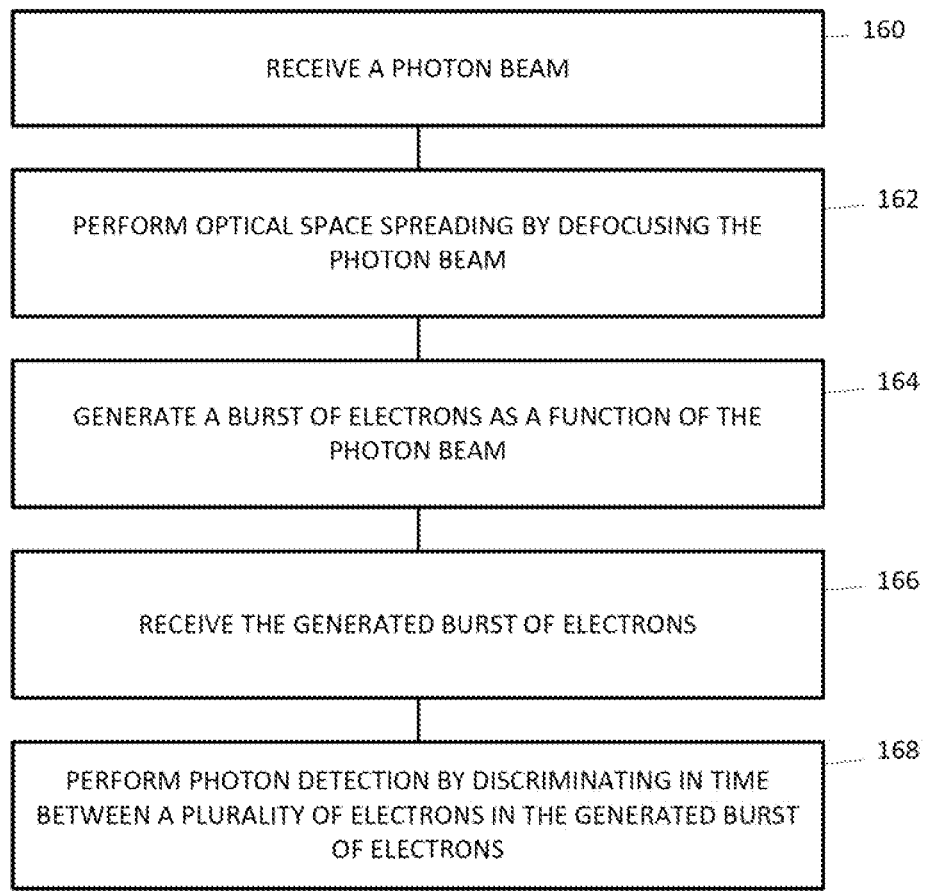
FIG. 5 is a flowchart illustrating a method of photon counting according to an embodiment of the present disclosure.

FIG. 5 is a flowchart illustrating a method of photon counting according to an embodiment of the present disclosure. The method illustrated in FIG. 5 comprises: receiving a photon beam (160); performing optical space spreading by defocusing the photon beam (162); generating a burst of electrons as a function of the photon beam (164); receiving the generated burst of electrons (166); and performing photon detection by discriminating in time between a plurality of electrons in the generated burst of electrons (168).

In an example embodiment, performing optical space spreading (162) comprises defocusing the beam over the surface of a photocathode, for example including multiplying electrons exiting the photocathode using a micro-channel plate. In another example embodiment, performing optical space spreading (162) comprises defocusing the beam over the surface of a silicon plate, for example including multiplying electrons exiting the photocathode by ionization when the electrons hit the surface of the silicon plate in response to a voltage applied between the photocathode and the silicon plate.

In an example embodiment, the photon detection (168) is performed in response to a determination that: a number of detected electrons at a particular pixel is above a pre-determined threshold; and the particular pixel has the highest number of detected electrons in a neighborhood pixels, the neighborhood of pixels having substantially the same size as that of a burst of electrons.

In another example embodiment, the method further comprises recording, at a plurality of memory registers in communication with a fast clock, the time of arrival of the plurality of electrons in the burst of electrons. In an example embodiment, when a photon is detected, the method further comprises increasing the value of a selected memory register associated with a selected CMOS chip pixel by 1, indicating that a photon has been detected at the selected CMOS chip pixel.

Embodiments of the present disclosure relate to a photon counter that can easily discriminate and count each photon, and to a reading process that is such that the frame rate is fast enough to register individual photon arrivals during daytime and dense cloud scenarios where photon arrival rates are high.

A feature of photon counting embodiments of the present disclosure is in spreading the light in time and space over a large area of a photo-detector such as, for example, a photocathode. In an example embodiment, the multiple bursts of electrons resulting from the multiplied or accelerated photo-electrons (produced by the multiple photons detected at the photocathode) feed into an electronic circuit that essentially detects the photons and counts them using a fast clock and memory registers to record their time of arrival. Processing and storage capability is provided on the imager itself. The imager comprises an intensifier placed over the imager. When a photon strikes the intensifier and is absorbed, a burst of electrons is generated by the plate and is detected by the CMOS chip pixel.

Embodiments of the present disclosure count photons using a micro-channel plate or silicon plate to spread light in time and space over a large area, and feed an electronic circuit which detects and counts the photons, for example by using a fast clock memory registers to record their time of arrival.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A photon counting sensor, comprising:
   an image intensifier configured to receive a photon beam, to perform optical space spreading by defocusing the photon beam, and to generate a burst of electrons as a function of the photon beam;
   a CMOS image sensor comprising a plurality of CMOS chip pixels configured to receive the generated burst of electrons; and
   an electronic circuit, in communication with the plurality of CMOS chip pixels, including a fast clock configured to perform photon detection by discriminating in time between a plurality of electrons in the generated burst of electrons received at the plurality of CMOS chip pixels.

2. The photon counting sensor of claim 1 wherein the image intensifier comprises a photocathode and a micro-channel plate, and wherein the image intensifier performs optical space spreading by defocusing the beam over the surface of the photocathode.

3. The photon counting sensor of claim 2 wherein electrons exiting the photocathode are multiplied by the micro-channel plate.

4. The photon counting sensor of claim 1 wherein the image intensifier comprises a photocathode and a silicon plate, and wherein the image intensifier performs optical space spreading by defocusing the beam over the surface of the silicon plate.

5. The photon counting sensor of claim 4 wherein electrons exiting the photocathode are multiplied by ionization when the electrons hit the surface of the silicon plate in response to a voltage applied between the photocathode and the silicon plate.

6. The photon counting sensor of claim 1 wherein the plurality of CMOS chip pixels are configured to perform the photon detection in response to a determination that:
   a number of detected electrons at a particular pixel is above a pre-determined threshold; and
   the particular pixel has the highest number of detected electrons in a neighborhood of pixels, the neighborhood of pixels having substantially the same size as a size of a burst of electrons.

7. The photon counting sensor of claim 1 wherein the electronic circuit includes a plurality of memory registers, in communication with the fast clock, the plurality of memory registers configured to record the time of arrival of the plurality of electrons in the burst of electrons generated by the image intensifier.

8. The photon counting sensor of claim 7 wherein, when a photon is detected, the value of a selected memory register associated with a selected CMOS chip pixel is increased by 1, indicating that a photon has been detected at the selected CMOS chip pixel, the selected memory register being among the plurality of memory registers and the selected CMOS chip pixel being among the plurality of CMOS chip pixels.

9. The photon counting sensor of claim 1 wherein the electronic circuit comprises a plurality of pixel circuits, each of the plurality of pixel circuits being associated with one of the plurality of CMOS chip pixels.

10. The photon counting sensor of claim 9 wherein at least some of the plurality of pixel circuits comprise:
    a field effect transistor (FET) to receive the electrons from the image intensifier;
    a comparator, coupled to the output of the FET;
    a buffering system coupled to the output of the comparator, the buffering system comprising an AND gate and a D flip-flop, the photon detection being performed by detecting the falling edge of the electron burst with the D flip-flop.

11. The photon counting sensor of claim 1 wherein the generated burst of electrons has a circular symmetric shape.

12. The photon counting sensor of claim 11 wherein the circular symmetric shape of the generated burst of electrons shows a gradient and is at a maximum intensity at its center.

13. A photon counting method, comprising:
    receiving a photon beam;
    performing optical space spreading by defocusing the photon beam;
    generating a burst of electrons as a function of the photon beam;
    receiving the generated burst of electrons; and
    performing photon detection by discriminating in time between a plurality of electrons in the generated burst of electrons.

14. The method of claim 13 performing optical space spreading comprises defocusing the beam over the surface of a photocathode.

15. The method of claim 14 further comprising multiplying electrons exiting the photocathode using a micro-channel plate.

16. The method of claim 13 wherein performing optical space spreading comprises defocusing the beam over the surface of a silicon plate.

17. The method of claim 16 further comprising multiplying electrons exiting the photocathode by ionization when the electrons hit the surface of the silicon plate in response to a voltage applied between the photocathode and the silicon plate.

18. The method of claim 13 wherein the photon detection is performed in response to a determination that:
    a number of detected electrons at a particular pixel is above a pre-determined threshold; and the particular pixel has the highest number of detected electrons in a neighborhood pixels, the neighborhood of pixels having substantially the same size as that of a burst of electrons.

19. The method of claim 13 further comprising recording, at a plurality of memory registers in communication with a fast clock, the time of arrival of the plurality of electrons in the burst of electrons.

20. The method of claim 19 further comprising, when a photon is detected, increasing the value of a selected memory register associated with a selected CMOS chip pixel by 1, indicating that a photon has been detected at the selected CMOS chip pixel.

\* \* \* \* \*